US012467299B2

(12) United States Patent
Janick et al.

(10) Patent No.: US 12,467,299 B2
(45) Date of Patent: Nov. 11, 2025

(54) VERTICALLY STACKING PANEL DOOR WITH CAM LEVERS

(71) Applicant: CornellCookson, LLC, Mountain Top, PA (US)

(72) Inventors: James Janick, Shavertown, PA (US); Thomas Balay, Drums, PA (US); Brandon C. Smith, Wapwallopen, PA (US)

(73) Assignee: CornellCookson, LLC, Mountain Top, PA (US)

( * ) Notice: Subject to any disclaimer, the term of this patent is extended or adjusted under 35 U.S.C. 154(b) by 0 days.

(21) Appl. No.: 18/608,710

(22) Filed: Mar. 18, 2024

(65) Prior Publication Data

US 2024/0218719 A1 Jul. 4, 2024

Related U.S. Application Data

(63) Continuation of application No. 17/039,980, filed on Sep. 30, 2020, now Pat. No. 11,933,094.

(51) Int. Cl.

| | |
|---|---|
| ***E05D 15/22*** | (2006.01) |
| ***E06B 3/50*** | (2006.01) |
| ***E06B 9/06*** | (2006.01) |
| *E06B 3/48* | (2006.01) |

(52) U.S. Cl.

CPC ................ *E05D 15/22* (2013.01); *E06B 3/50* (2013.01); *E06B 9/0676* (2013.01); *E05Y 2900/106* (2013.01); *E05Y 2900/11* (2013.01); *E06B 3/481* (2013.01)

(58) Field of Classification Search

CPC . E05D 15/22; E05D 2015/225; E05D 15/165; E06B 3/50; E06B 9/0638; E06B 9/0676; E05Y 2201/626

See application file for complete search history.

(56) References Cited

U.S. PATENT DOCUMENTS

| | | | | |
|---|---|---|---|---|
| 3,618,656 A * | 11/1971 | Young | E06B 9/0638 | 160/207 |
| 4,139,042 A * | 2/1979 | Watanabe | E06B 9/0638 | 160/36 |
| 5,685,355 A * | 11/1997 | Cook | E06B 9/0638 | 160/202 |
| 5,893,403 A * | 4/1999 | Megens | E05D 15/262 | 160/35 |
| 6,463,988 B1 * | 10/2002 | Mullet | E05D 15/165 | 160/209 |
| 2006/0175027 A1 * | 8/2006 | Langenbach | E06B 9/0638 | 160/218 |
| 2012/0285090 A1 * | 11/2012 | Williams | E04B 2/827 | 49/73.1 |
| 2019/0316399 A1 * | 10/2019 | Sauve | E05F 15/681 | |
| 2023/0048791 A1 * | 2/2023 | Hayes | E05F 5/06 | |

FOREIGN PATENT DOCUMENTS

| | | |
|---|---|---|
| DE | 20 2010 004 726 | * 8/2010 |
| WO | WO 03/076753 | * 9/2003 |

* cited by examiner

*Primary Examiner* — Gregory J Strimbu

(57) ABSTRACT

In example implementations, a vertical stacking door includes an end cap that is coupled to a panel. The end cap includes a body portion, a cam lever to rotate around an axis to generate a lift force to lift and separate an adjacent panel of a plurality of panels of the vertical stacking door, a first track wheel, a second track wheel, and a third track wheel.

11 Claims, 12 Drawing Sheets

VERTICALLY STACKING PANEL DOOR WITH CAM LEVERS

CROSS REFERENCE TO RELATED APPLICATIONS

This application claims the priority of U.S. patent application Ser. No. 17/039,980, filed on Sep. 30, 2020, now U.S. Pat. No. 11,933,094, which is herein incorporated by reference in its entirety.

BACKGROUND

Vertically moving doors can be used for a variety of applications. For example, vertically moving doors can be used as garage doors in residential locations or doors for bays and entrances to warehouses in commercial locations.

Some vertically moving doors can be pulled open by a motor along a track. Typically the moving doors can be moved along a track as a single piece to lay horizontally with the floor along the track.

DETAILED DESCRIPTION

Examples described herein provide examples of a vertically stacking panel door with cam levers. As discussed above, currently available vertically moving doors are pulled along a track by a motor in the track. The door lies horizontally or parallel with the floor in a single piece.

However, there are some instances where customers would like to have more clearance in the area above the floor where the single piece door would rest when opened. For example, the single piece door may limit the amount of vertical clearance in the garage, commercial loading dock, and the like. In addition, with single piece doors, the entire door is replaced when damaged. In contrast, a single damaged panel of a vertically stacking panel door can be replaced, lowering repair costs.

The present disclosure provides a vertically stacking panel door with cam levers that can separate and stack panels of the door. The vertically stacking panel door of the present disclosure may include end caps with the cam levers that provide a unique and efficient mechanism to separate and lift each panel into a horizontal ramp. The horizontal ramp may also be designed to work with the wheels on the end caps to easily guide each panel in a vertically stacking position. In addition, the end caps may be designed to minimize noise during stacking and to maintain an aligned position as the door is opened and closed.

The separation and lifting mechanism provided by the cam levers on the end caps may allow existing panel doors to be easily retro-fitted with the vertically stacking panel door system of the present disclosure. In addition, the separation and lifting mechanism provided by the cam levers on the end caps may allow the panel door to have different sized vertical panels within the door. This may lead to more customization options for the customer.

Figure 1:
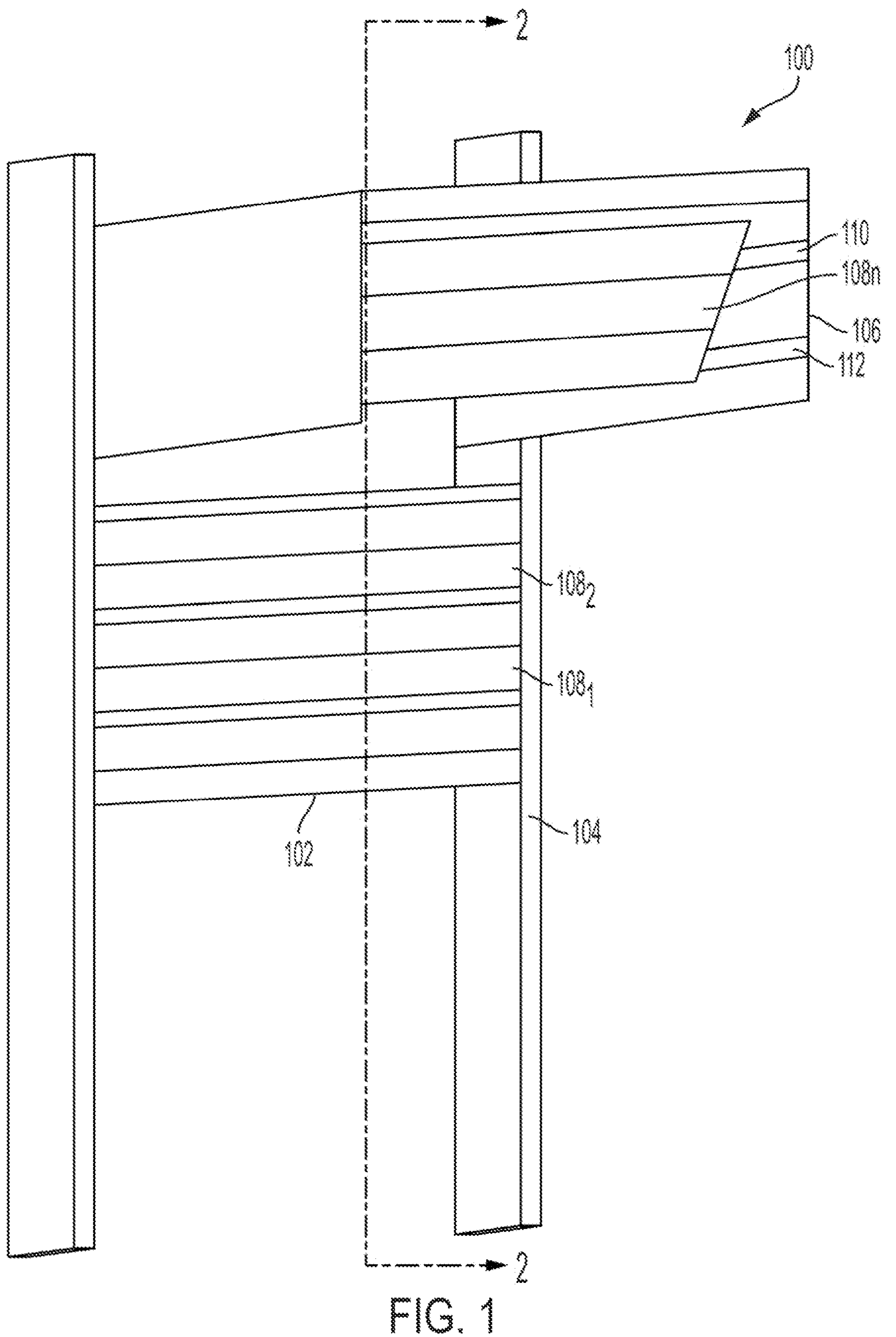
FIG. 1 illustrates an isometric view of an example of the vertically stacking panel door of the present disclosure.

FIG. 1 illustrates an isometric view of an example vertically stacking panel door system 100 of the present disclosure. The vertically stacking panel door system 100 may include a door 102 that is comprised of a plurality of panels $\mathbf{108}_1$ to $\mathbf{108}_n$ (hereinafter also referred to individually as a panel 108 or collectively as panels 108). The door 102 may be opened by moving the panels 108 vertically along a vertical door guide 104. As the panels 108 are separated, the panels 108 can be stacked along a horizontal door guide 106.

In one embodiment, the panels 108 may include end caps (illustrated and discussed in further details below) that include wheels that can move within a first track 110 and a second track 112. The first track 110 and the second track 112 may also be referred to as a top track 110 and a bottom track 112. The first track 110 and the second track 112 may be parallel and may be positioned at a slight angle to allow for gravity assist when the door 102 is closing.

In one embodiment, the door 102 may be closed by moving the panels 108 towards the vertical door guide 104 one-by-one. The panels 108 may be stacked on top of one another as the door 102 is closed.

Figure 2:
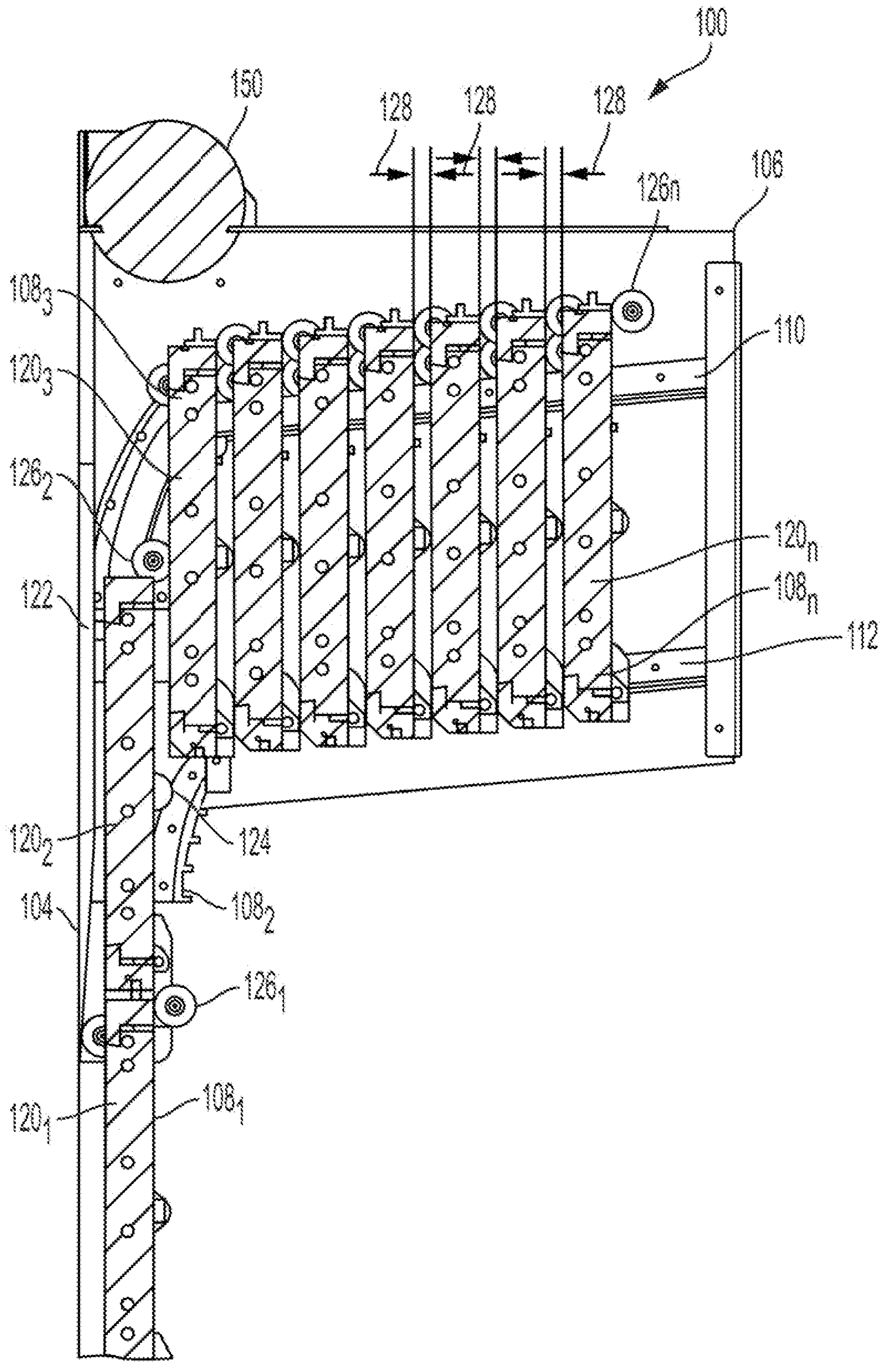
FIG. 2 is a cross-sectional side view along line 2-2 of FIG. 1 of an example of the vertically stacking panel door of the present disclosure.

FIG. 2 illustrates a cross-sectional side view of the vertically stacking panel door system 100. FIG. 2 illustrates how the panels 108 are stacked vertically along the horizontal door guide 106. In one embodiment, the vertically stacking panel door system 100 may include a rotating mechanism 150. The rotating mechanism 150 may be connected to a cable (not shown) that is coupled to the bottom most panel 108 (e.g., panel $\mathbf{108}_1$ in FIG. 1). The rotating mechanism 150 may be coupled to a motor and powered by the motor or may be manually operated to rotate. When the rotating mechanism 150 is operated to open the door 102, the rotating mechanism 150 may pull the bottom most panel 108 up. When the rotating mechanism 150 is operated to close the door 102, the rotating mechanism may rotate in an opposite direction to allow the bottom most panel 108 to slide towards, and down, the vertical door guide 104 into a closed position.

In one embodiment, each panel 108 may include end caps $\mathbf{120}_1$ to $\mathbf{120}_n$ (hereinafter also referred to individually as an end cap 120 or collectively as end caps 120). In one embodiment, each panel 108 may include an end cap 120 on both a left and right side of the panel 108. In other words, each side of the panel 108 adjacent to the rails within the vertical door guide 104 may include an end cap 120.

Each end cap $120_1$ to $120_n$ may include a cam lever $126_1$ to $126_n$ (hereinafter also referred to individually as a cam lever 126 or collectively as cam levers 126) of the present disclosure. In one embodiment, the cam lever 126 may provide a mechanism to provide lift and separation between adjacent panels 108. As a panel 108 approaches a track coupling 124, the cam lever 126 may also help guide the panel 108 to the first track 110 and the second track 112 of the horizontal door guide 106.

In one embodiment, the vertical door guide 104 may include a ramp 122. The ramp 122 may provide an inclined surface that causes the cam lever 126 to rotate around an axis and lift an end of the cam lever 126 upwards to lift and separate an adjacent panel 108. Examples of this operation are illustrated in FIGS. 6-9, and discussed in further details below.

In one embodiment, additional features of the end caps 120 allow the panels 108 to be spaced evenly apart. For example, each panel 108 may be spaced apart by a distance 128 measured between surfaces of the adjacent panels 108 in the horizontal door guide 106. In addition, the features of the end caps 120 may allow the panels 108 to be positioned parallel to one another in a vertical position. In other words, the panels 108 may be stacked such that the panel 2108 are not angled towards one another or away from one another.

Figure 3:
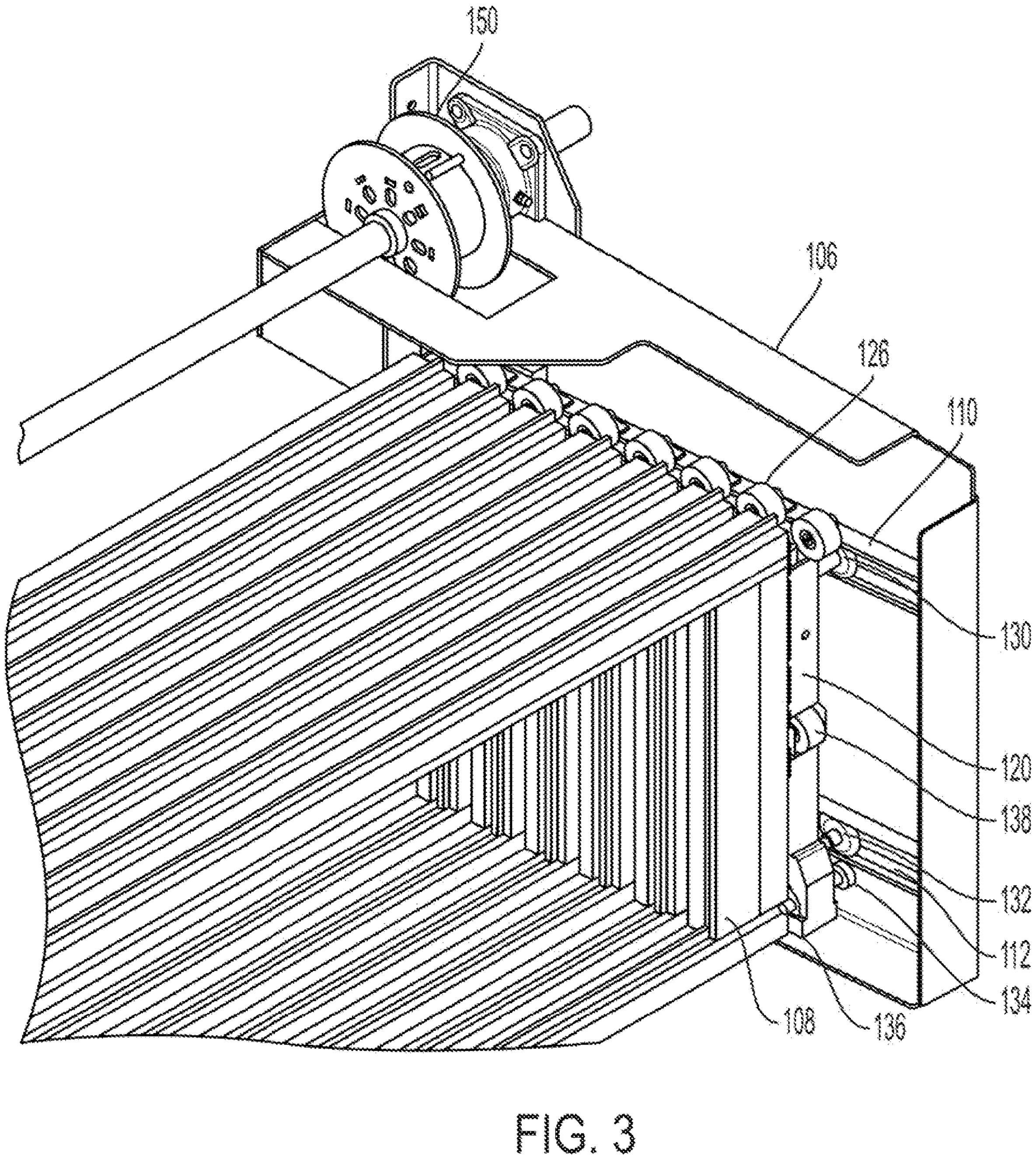
FIG. 3 is an isometric top view of example panels in a horizontal door guide of the present disclosure.

FIG. 3 illustrates an isometric top view of the panels 108 stacked in the horizontal door guide 106. FIG. 3 illustrates a first track wheel 130 and a second track wheel 132 of the end cap 120 positioned in the first track 110 and the second track 112, respectively. The end cap 120 may also include a third track wheel 134 that hangs freely when the panel 108 is stacked in the horizontal door guide 106.

In one embodiment, the end cap 120 may also include a cam surface 136 and a guide wheel 138. The cam surface 136 may be fabricated from a polymer or rubber material. The cam surface 136 may provide a desired spacing between the panels 108 in the horizontal door guide 106 (e.g., the spacing 128 illustrated in FIG. 2). The cam surface 136 may also provide noise dampening to reduce an amount of noise created by the panels 108 contacting one another as the door 102 is being opened and the panels 108 vertically stacked.

Figure 9:
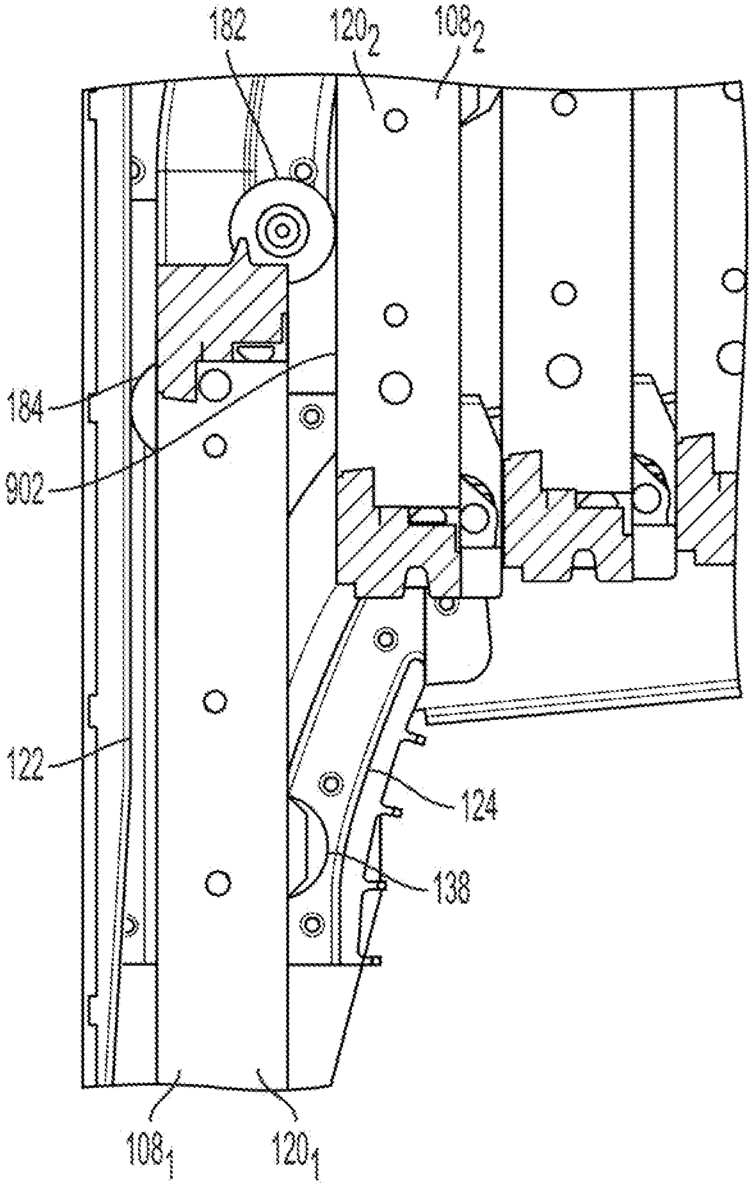
FIG. 9 is a close up side view of an example of the lower adjacent panel that moves into position to be stacked in the horizontal door guide via the track coupling for a subsequent lifting action of the present disclosure.

In one embodiment, the guide wheel 138 may provide support for an adjacent panel 108 during the process of the vertical stacking. The guide wheel 138 may roll up the front side of a panel 108 to keep the adjacent panel 108 in a parallel position rather than swinging at an angle towards an adjacent panel 108 that is moving up the vertical door guide 104 and into the track coupling 124. Further details of the guide wheel 138 in operation are illustrated in FIG. 9 and discussed in further details below.

Figure 4:
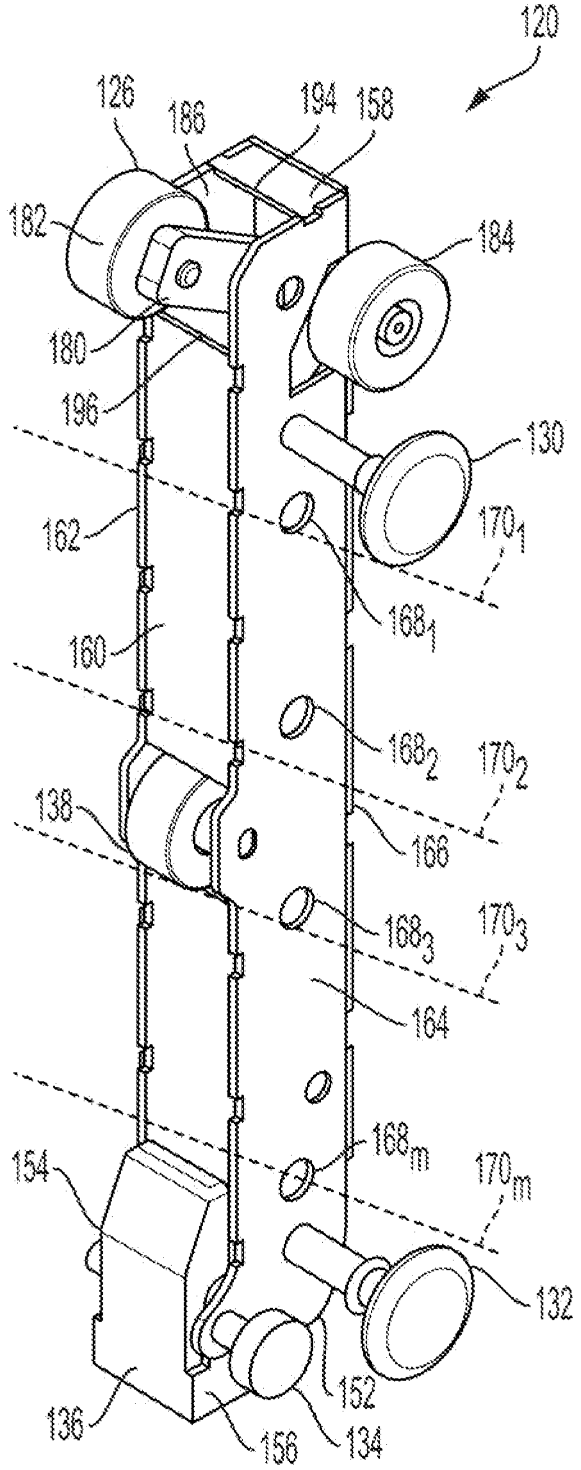
FIG. 4 is an isometric view of an example end cap with a cam lever of the present disclosure.

FIG. 4 illustrates a more detailed isometric view of the end cap 120 of the present disclosure. The end cap 120 may include a body portion that is formed by a plurality of surfaces that are coupled together. The body portion may include a back side 160, a front side 166, a side (e.g., a right side) 162, a side (e.g., a left side) 164, a top end 158, and a bottom end 156. In one embodiment, the back side 160, the front side 166, the left side 164, the right side 162, the top end 158, and the bottom end 156 may be coupled together to form an approximately rectangular shaped column structure. The back side 160, the front side 166, the left side 164, the right side 162, the top end 158, and the bottom end 156 may be fabricated from sheet metal.

In one embodiment, the back side 160 may face an interior side of the door (e.g., towards an inside of the building) and the front side 166 may face an exterior side of the door (e.g., towards the outside or exterior of the building). The top end 158 may face towards the horizontal door guide 106. The bottom end 156 may face towards the floor or away from the horizontal door guide 106.

In one embodiment, the sides 162 and 164 may be interchanged depending on whether the end cap 120 is for the left side of the panel 108 or the right side of the panel 108. The example illustrated in FIG. 4 is for the right side of the panel 108 when facing the back of the panel 108 (e.g., when facing the door 102 illustrated in FIG. 1). Thus, an end cap 120 for the left side of the panel 108 may have features located on the side 164 flipped to the side 162.

In one embodiment, the end cap 120 may include a plurality of openings $168_1$ to $168_m$ (hereinafter also referred to individually as an opening 168 or collectively as openings 168). The openings 168 may align with corresponding openings (not shown) on the side 162. Dashed lines $170_1$ to $170_m$ represent how the openings $168_1$ to $168_m$ run through the side 164 and 162. The openings 168 may allow the end cap 120 to be coupled to the sides of the panels 108. For example, a mechanical fastener, such as a screw, a nail, and the like, may be fit through an opening 168 and into the sides of the panel 108.

Thus, the end caps 120 may be fabricated to be approximately the height of the panel 108 and be retrofitted to the panels 108 of existing doors 102. In addition, the end caps 120 may allow the panels 108 to be fabricated into different heights since the end caps 120 can be fabricated to match the height of the panels 108. This may provide more customization options for the door 102.

In one embodiment, the end cap 120 may include the first track wheel 130, the second track wheel 132, and the third track wheel 134 illustrated in FIG. 3. The first track wheel 130, the second track wheel 132, and the third track wheel 134 may be fabricated from nylon or any other type of polymer or plastic to reduce noise as the panels 108 are vertically stacked. The first track wheel 130, the second track wheel 132, and the third track wheel 134 may rotate to reduce friction when moving within the vertical door guide 104 and the horizontal door guide 106. However, fabricating the wheels 130, 132, and 134 with plastic may allow the wheels 130, 132, and 134 to slide in the event that one of the wheels 130, 132, or 134 becomes stuck rotationally (e.g., fails to rotate or spin).

In one embodiment, the first track wheel 130 and the second track wheel 132 may be positioned on opposite ends of the side 164 of the end cap 120. For example, the first track wheel 130 may be positioned towards the top end 158 on the side 164, and the second track wheel 132 may be positioned towards the bottom end 156 on the side 164. The first track wheel 130 and the second track wheel 132 may be aligned vertically along a center line of the side 164. The first track wheel 130 and the second track wheel 132 may have equal diameters. The diameter of the first track wheel 130 and the diameter of the second track wheel 132 may be sized to fit within the first track 110 and the second track 112.

In one embodiment, the third track wheel 134 may be located towards the bottom end 156 of the end cap 120. The third track wheel 134 may be located on the side 164, but on a portion 154 of the cam surface 136 that protrudes away from the back side 160. For example, the cam surface 136 may be comprised of the portion 154 and a curved portion 152 that wraps around the bottom end 156 and towards the front side 166. The third track wheel 134 may be located on the portion 154 of the cam surface 136 such that the third track wheel 134 is located further away from the back side 160 than the second track wheel 132. In other words, when facing the side 164, the third track wheel 134 may be positioned to the left of the second track wheel 132.

In one embodiment, the third track wheel 134 may protrude a shorter distance from the side 164 than the first track wheel 130 and the second track wheel 132. In other words, the first track wheel 130 and the second track wheel 132 may extend beyond the third track wheel 134 as shown in FIG. 4.

In one embodiment, the first track wheel 130, the second track wheel 132, and the third track wheel 134 may be positioned to align with different track portions of the track coupling 124. The location, size, and design of the first track wheel 130, the second track wheel 132, and the third track wheel 134 may allow the panel 108 to move up and horizontally into the horizontal door guide 106, as illustrated in FIGS. 6-12, and discussed in further details below.

In one embodiment, the end cap 120 may include the guide wheel 138 that was introduced in FIG. 3. The guide wheel 138 may be located approximately in a center of the back side 160. The guide wheel 138 may protrude out from the back side 160. In other words, a surface of the guide wheel 138 may extend beyond the back side 160. In one embodiment, a surface of the portion 154 of the cam surface 136 and the surface of the guide wheel 138 may lie on a common plane. Thus, the guide wheel 138 and the portion 154 may help provide the spacing 128 between panels 108. In addition, the guide wheel 138 may provide support to the panels 108 during a transition between the vertical door guide 104 and the horizontal door guide 106, as discussed in further details below.

The end cap 120 may also include the cam lever 126. In one embodiment, the cam lever 126 may include a cam body portion 180, a first cam wheel 182, and a second cam wheel 184. In one embodiment, the cam body portion 180 may be rotatably coupled to the side 164. Thus, the cam body portion 180 may rotate around an axis of the rotatable coupling. The cam body portion 180 may be fabricated from sheet metal. In one embodiment, the shape of the cam lever 126, in conjunction with the shape and location on the end cap 120 enables the cam lever 126 to work without springs or other mechanisms that would assist the cam lever 126 to always be in the correct position for the door 102 to work properly.

In one embodiment, the cam body portion 180 may be located inside of the end cap 120 towards the top end 158. An opening 186 may be formed along a portion of the top end 158 and the back side 160. The cam body portion 180 may be extend out through the opening 186 and away from the back side 160. In one embodiment, surfaces 194 and 196 of the opening 186 may limit an amount of rotation of the cam body portion 180. Thus, the cam lever 126 may rotate an amount limited by the surfaces 194 and 196. In one embodiment, the surfaces 194 and 196 may include a plastic or rubber surface to dampen the sound when the cam body portion 180 contacts the surfaces 194 and 196 as the door 102 is opened and closed.

Figure 5:
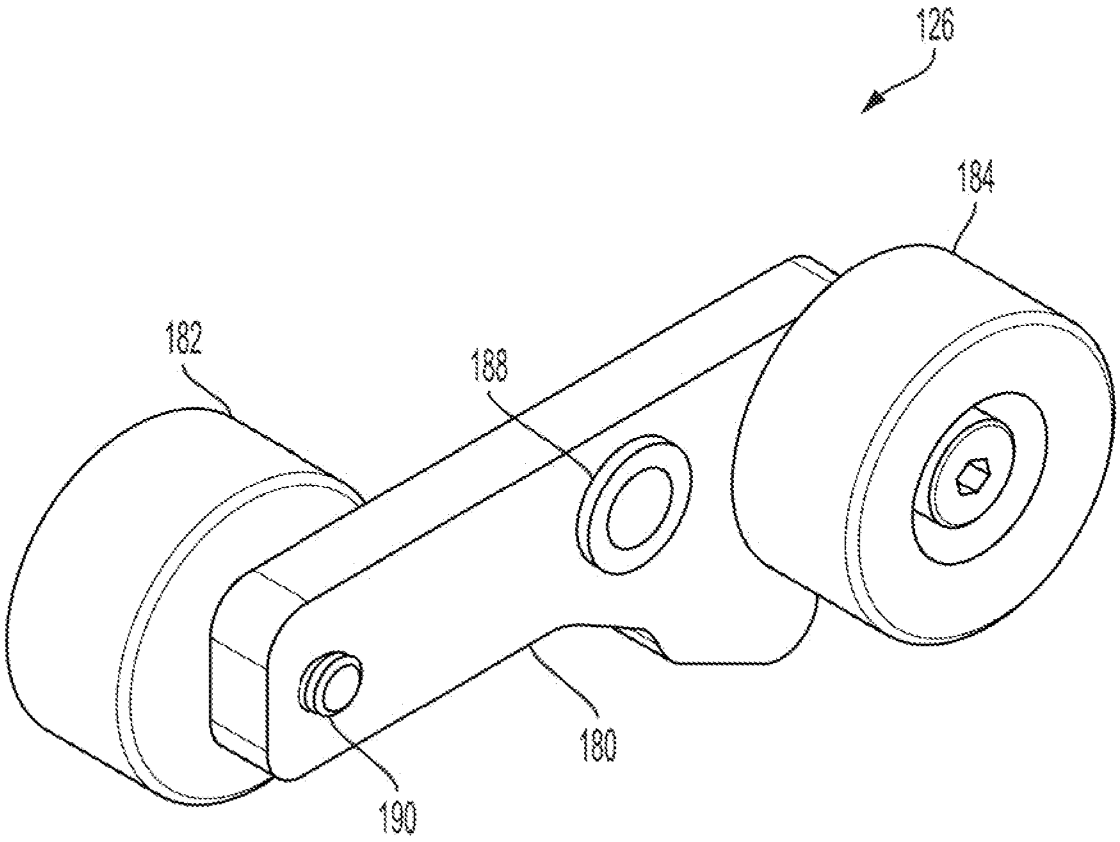
FIG. 5 is an isometric view of the cam lever of the present disclosure.

FIG. 5 illustrates a close up view of the cam lever 126 of the present disclosure. As noted above, the cam lever 126 includes the cam body portion 180, the first track wheel 182, and the second track wheel 184. The first track wheel 182 and the second track wheel 184 may be fabricated from nylon or any other type of plastic and/or polymer. The first track wheel 182 may be coupled onto a first side and first end of the cam body portion 180. The first track wheel 182 may be coupled via a rotatable coupling 190. Thus, the first track wheel 182 may rotate freely around the axis of the rotatable coupling 190.

In one embodiment, the second track wheel 184 may be coupled to a second side and a second end of the cam body portion 180. The second side may be opposite the first side and the second end may be opposite the first end. In other words, the first track wheel 182 and the second track wheel 184 may be positioned on opposite ends of the cam body portion 180 to face in opposite directions.

The cam body portion 180 may include an opening 188. The cam body portion 180 may be coupled to the side 164 of the end cap 120 via a rotatable mechanical coupling or fastener to allow the cam lever 126 to rotate around the axis of the opening 188.

Figure 6:
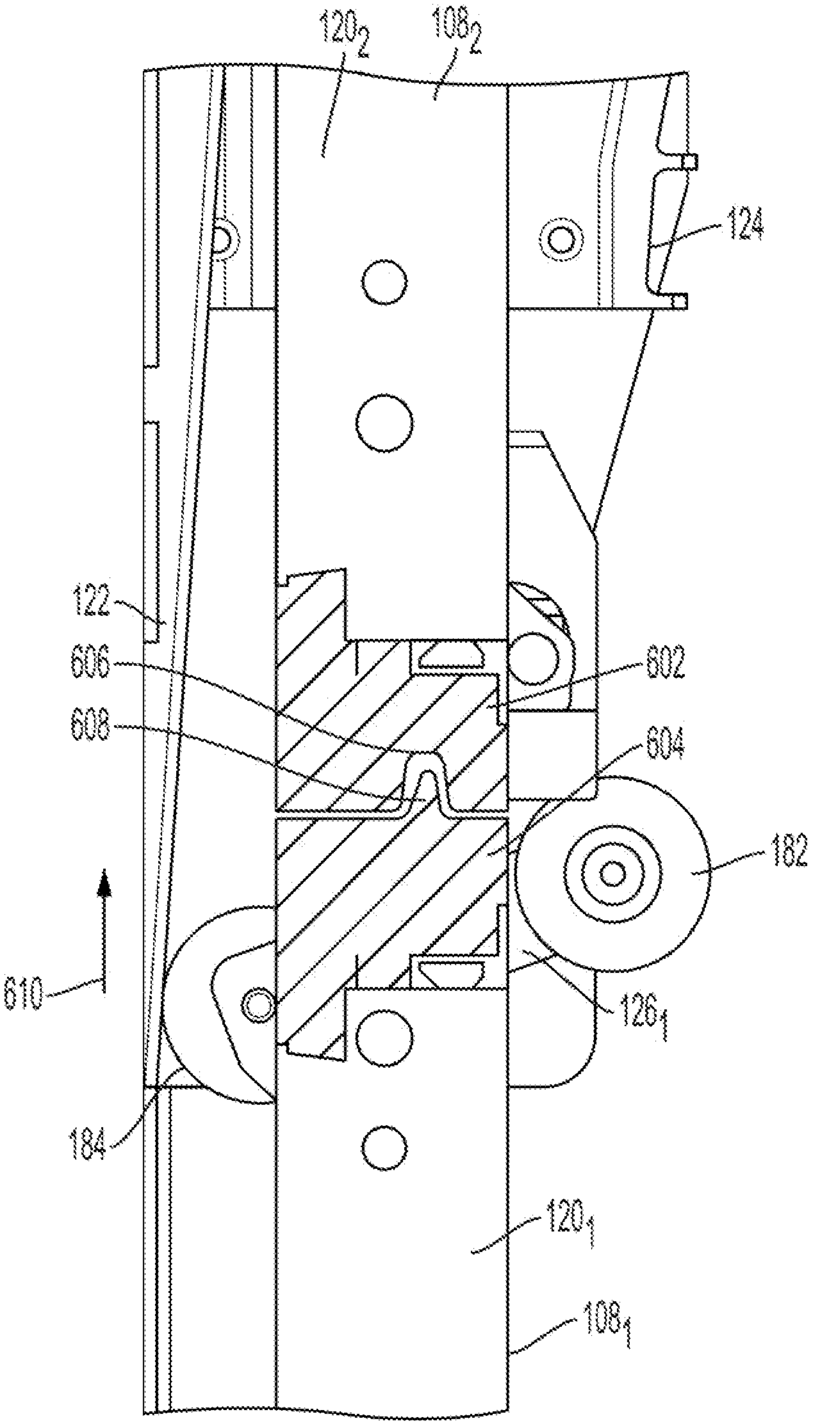
FIG. 6 is a close up side view of an example interaction between two adjacent panels of the present disclosure at a starting point of lifting.

FIGS. 6-9 illustrate a close up view of the interaction between adjacent panels 108 and how the cam lever 126 is operated to lift and separate adjacent panels 108 of the door 102 during an opening operation. FIG. 6 illustrates an example of a moment in time when adjacent panels $\mathbf{108}_1$ and $\mathbf{108}_2$ are in contact with one another. For example, the door 102 may be in a closed position and beginning to move vertically upward in a direction shown by an arrow 610 to open.

In one embodiment, the panels $\mathbf{108}_1$ and $\mathbf{108}_2$ may include an alignment feature. For example, the panels 108 may include an alignment member 604 at the top end 158 of the end cap 120 and an alignment member 602 at the bottom end 156 of the end cap 120. Although the alignment members 602 and 604 are illustrated as being part of the end cap 120, it should be noted that the alignment members 602 and 604 may also be coupled to top and bottom ends of the panels 108.

In one example, the alignment member 602 on the bottom end 156 of the end cap $\mathbf{120}_2$ may be in contact with the alignment member 604 on the top end 158 of the end cap $\mathbf{120}_1$. The alignment member 602 may include a slot 606. The alignment member 604 may include a protruding member 608. In one embodiment, the slot 606 may have an angled or parabolic shape. Thus, the opening may provide a wider clearance for the protruding member 608 to enter the slot 606. The angled surfaces of the slot 606 may allow the protruding member 608 to slide towards a centered peak of the slot 606. Thus, when the door 102 is closed, the interaction between the protruding member 608 and the slot 606 may allow the adjacent panels $\mathbf{108}_1$ and $\mathbf{108}_2$ to be vertically aligned (e.g., the front side and back side of the panels $\mathbf{108}_1$ and $\mathbf{108}_2$ may lie on a common vertical plane).

Figure 7:
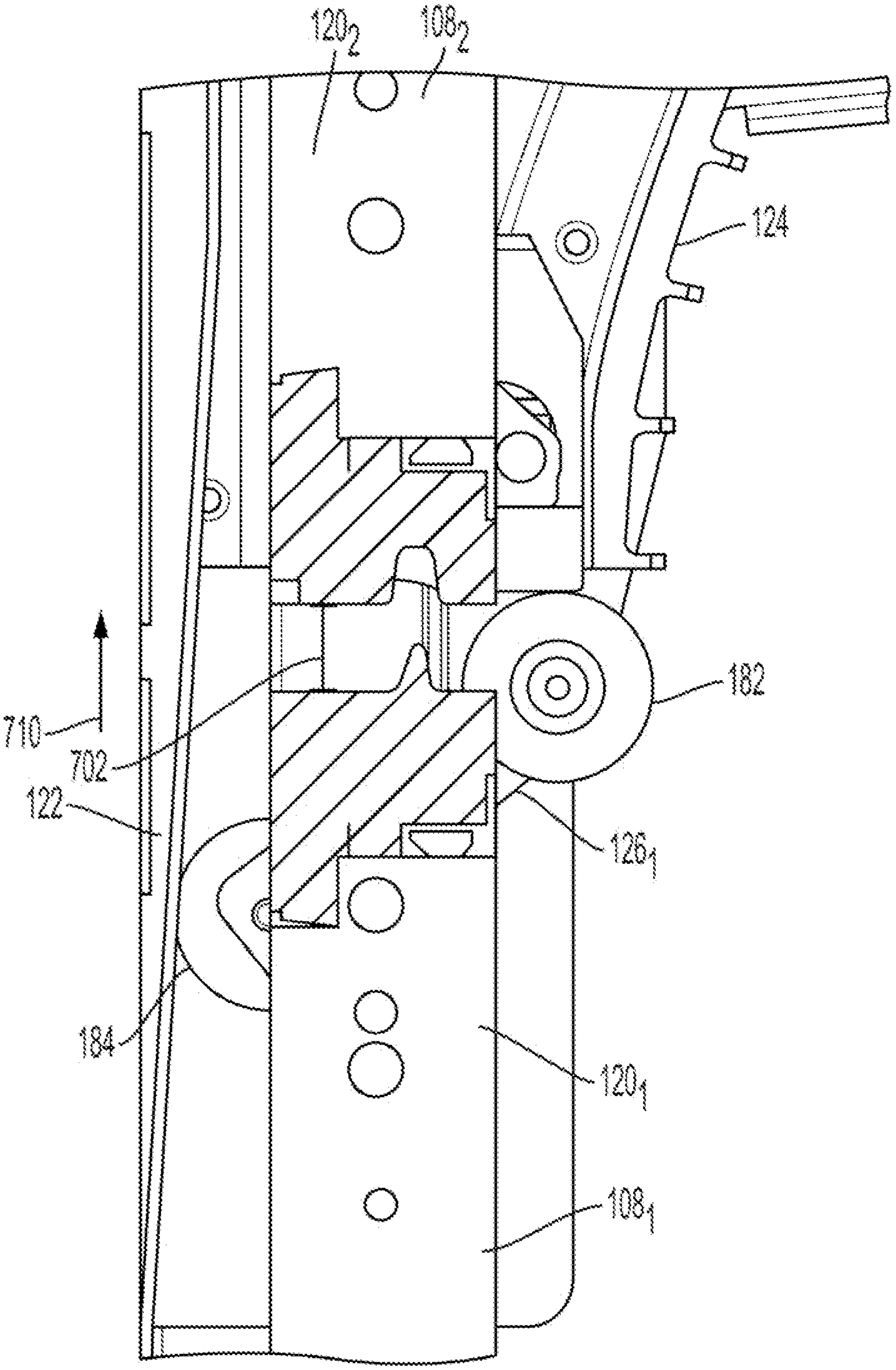
FIG. 7 is a close up side view of an example interaction between two adjacent panels of the present disclosure as the cam lever is moved to lift an adjacent panel.

FIG. 7 illustrates a subsequent moment in time of the panels $\mathbf{108}_1$ and $\mathbf{108}_2$ moving upward in a direction illustrated by an arrow 710. For example, at a later moment in time, the second cam wheel 184 of the lever $\mathbf{126}_1$ of the endcap $\mathbf{120}_1$ may interact with the ramp 122. The incline of the ramp 122 may cause the cam lever $\mathbf{126}_1$ to rotate such that the second cam wheel 184 moves down (e.g., in the direction opposite the arrow 710) and the first cam wheel 182 moves up (e.g., in the direction of the arrow 710).

As the first cam wheel 182 moves up, the first cam wheel 182 may contact the cam surface 136 of the end cap $\mathbf{120}_2$ of the panel $\mathbf{108}_2$. The cam lever $\mathbf{126}_1$ may generate enough force to lift and separate the panel $\mathbf{108}_2$ from the panel $\mathbf{108}_1$ at a distance 702 shown in FIG. 7. As the panel $\mathbf{108}_2$ is lifted, the first track wheel 130 may enter a first track portion of the track coupling 124 towards the first track 110 of the horizontal door guide 106 illustrated in FIGS. 1-3.

Figure 8:
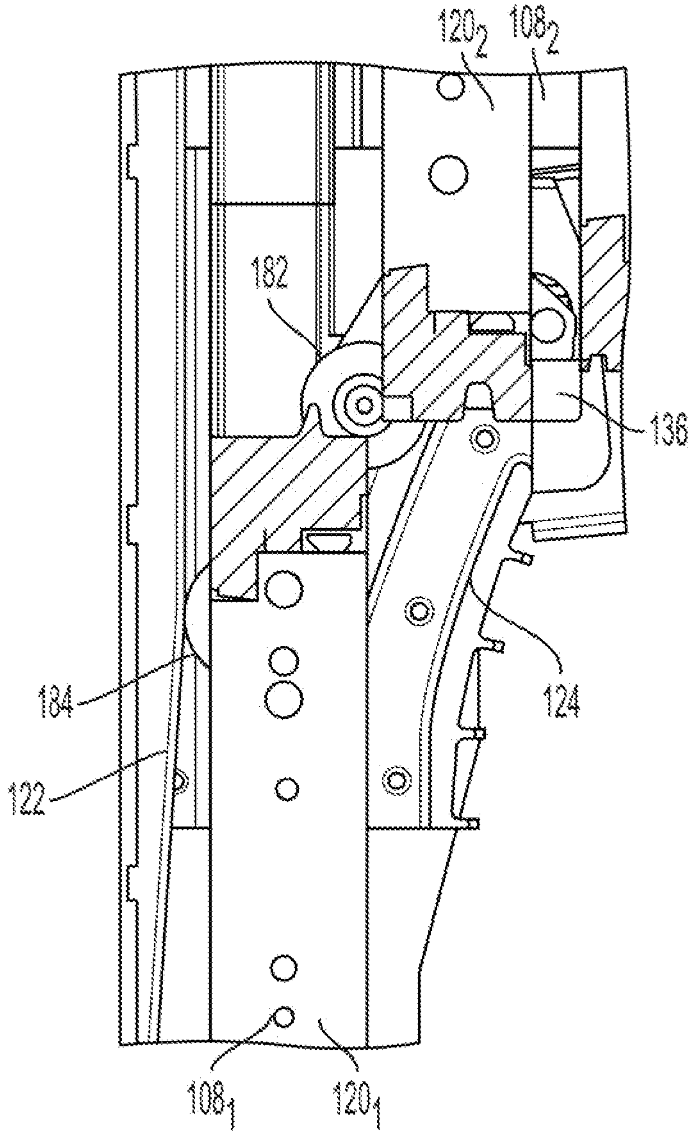
FIG. 8 is a close up side view of an example of the adjacent panel that is lifted and transitioned to a horizontal door guide via a track coupling of the present disclosure.

FIG. 8 illustrates a subsequent moment in time after the moment illustrated in FIG. 7. As the panel $\mathbf{108}_1$ continues to move vertically upwards, the first cam wheel 182 of the cam lever $\mathbf{126}_1$ may continue to push the panel $\mathbf{108}_2$ upwards and to the right into the horizontal door guide 106.

Figure 11:
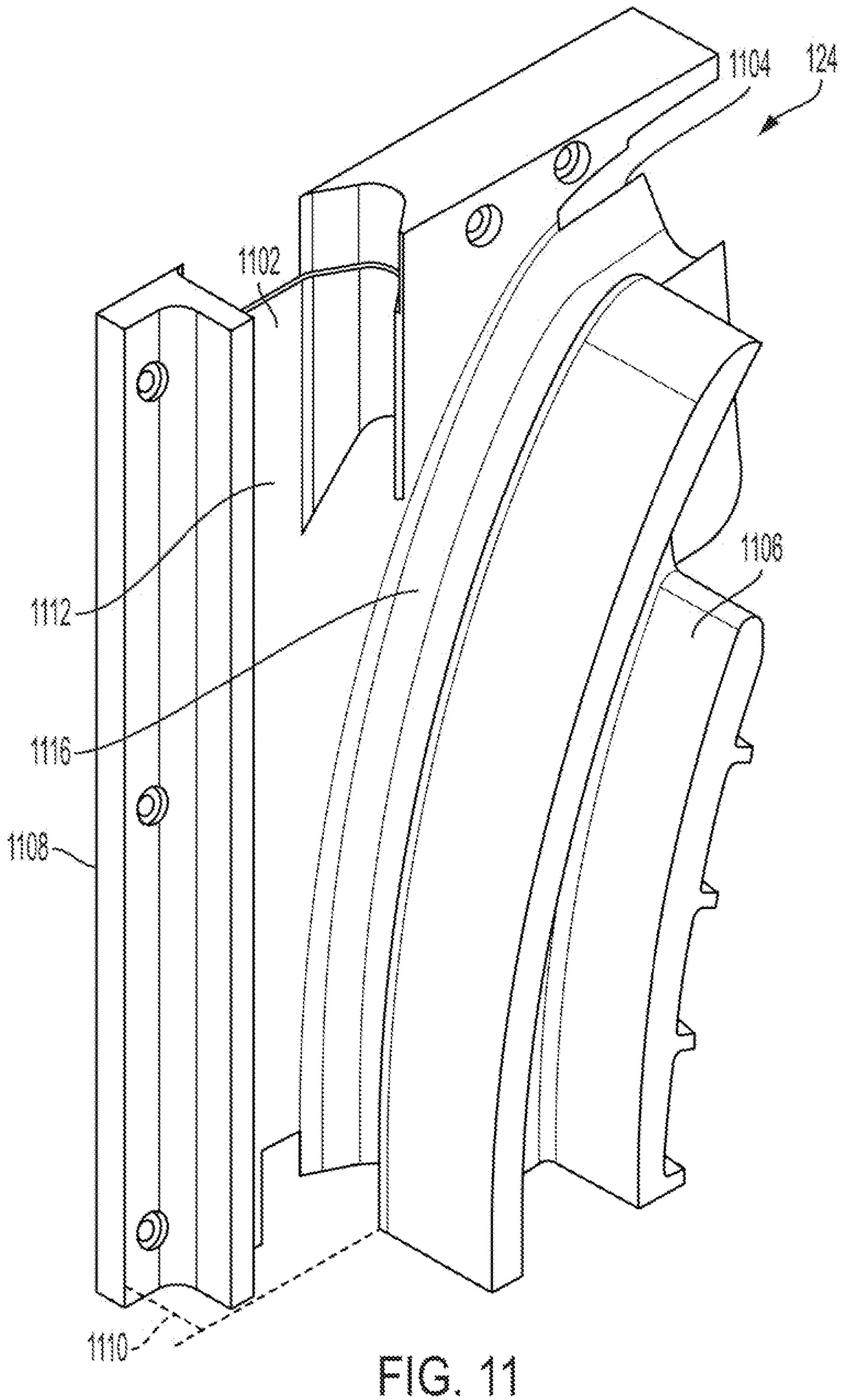
FIG. 11 is an isometric view of a track coupling of the present disclosure to show an inner wheel track and an outer wheel track of the lower section of the ramp.

In one embodiment, the design of the track coupling 124 and the third track wheel 134 on the end caps 120 may improve the movement of the panels 108 into the horizontal door guide 106. FIG. 11 illustrates a more detailed view of the track coupling 124.

In one embodiment, the track coupling 124 may include first track portion 1102, a second track portion 1104, and a third track portion 1106. The first track portion 1102 may include a first track portion opening 1112. The second track portion 1104 may include a second track portion opening 1116. The third track portion 1106 may include a third track portion opening 1114.

In one embodiment, the first track portion 1102 may be connected to the first track 110 of the horizontal door guide 106. The second track portion 1104 may be connected to the second track 112 of the horizontal door guide 106. The first track portion 1102 and the second track portion 1104 may be referred to as the inner tracks. The first track portion 1102 and the second track portion 1104 may lie parallel relative to a surface 1108 of the track coupling 124.

In one embodiment, the third track portion 1106 may be referred to as an outer track. For example, the third track portion 1106 may be positioned a distance 1110 away from the surface 1108. In other words, the third track portion 1106 may be closer to the end cap 120 than the first track portion 110 and the second track portion 1104.

In one embodiment, a distance between the third track portion opening 1114 and the first track portion opening 1112 may be approximately the same as the distance between the first track wheel 130 and the third track wheel 134 on the end cap 120. As a result, the third track wheel 134 may enter the third track portion opening 1114 at approximately the same time that the first track wheel 130 enters the first track portion opening 1112.

Figure 12:
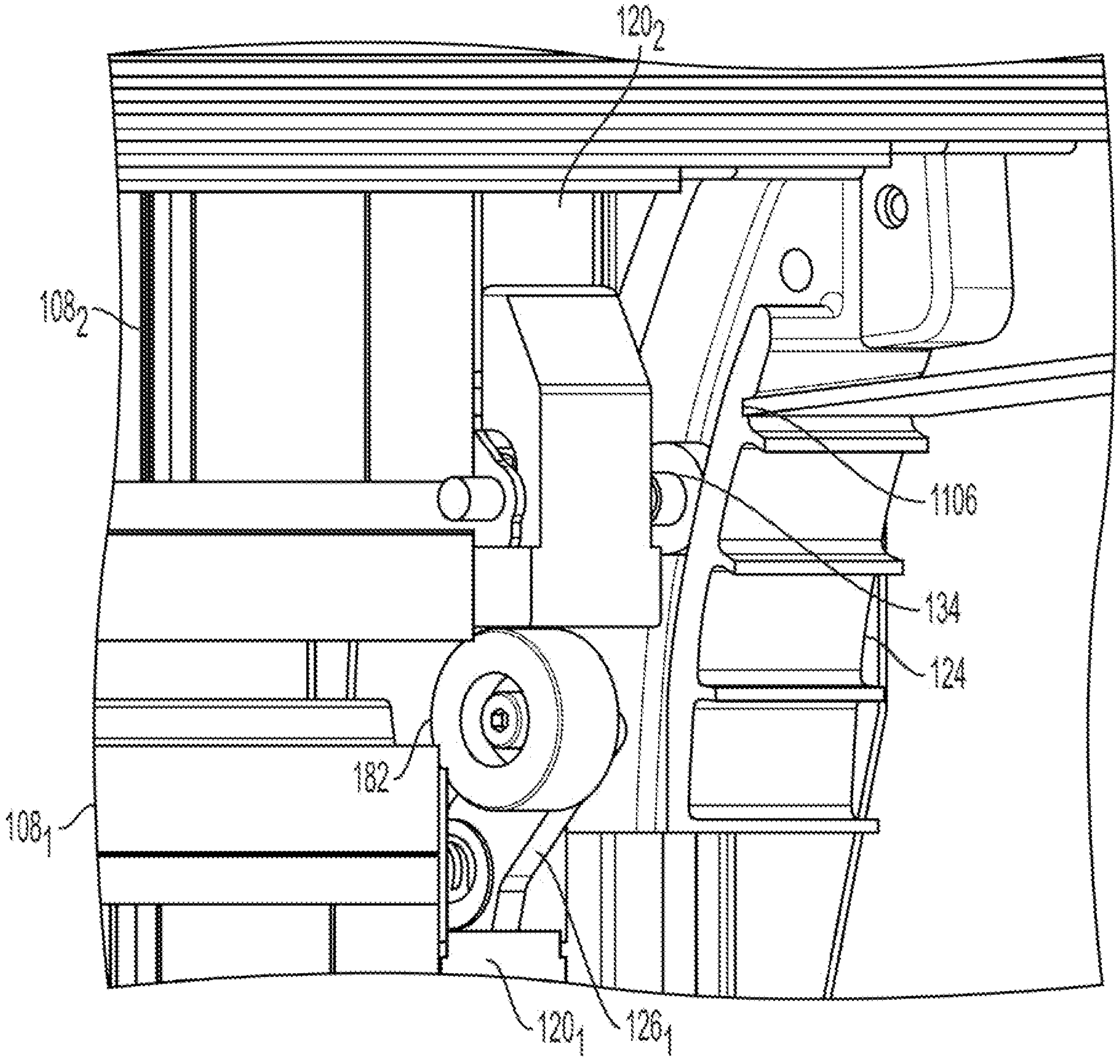
FIG. 12 is a close up side view of an example of a third track wheel of the end cap entering the outer wheel track of the lower section of the track coupling of the present disclosure.

As the panel $\mathbf{108}_2$ continues to move vertically upwards, the movement of the third track wheel 134 within the third track portion 1106 may allow the panel $\mathbf{108}_2$ to also move horizontally into the horizontal door guide 106. Without the third track wheel 134 and the third track portion 1106, the panel $\mathbf{108}_2$ may continue to move vertically upwards without moving horizontally. FIG. 12 illustrates a close up view of the third track wheel 134 inside of the third track portion 1106 of the track coupling 124.

The panel $\mathbf{108}_2$ may continue moving vertically and horizontally until the second track wheel 132 enters the second track portion 1104 via the second track portion opening 1116. As the first track wheel 130 and the second track wheel 132 continue to move within the first track 110 and the second track 112, respectively, the third track wheel 134 may exit the third track portion 1106 and hang freely in the horizontal door guide 106, as shown in FIG. 3.

Thus, referring back to FIG. 8, as the panel $\mathbf{108}_1$ continues to move vertically, the force of the second cam wheel 182 against the cam surface 136 may continue to move the panel $\mathbf{108}_2$ through the track coupling 124 and into the horizontal door guide 106. For example, as the panel $\mathbf{108}_2$ is pushed by the second cam wheel 182, the first track wheel 130, the second track wheel 132, and the third track wheel 134 may interact with the first track portion 1102, the second track portion 1104, and the third track portion 1106, as described above.

FIG. 9 illustrates a close up side view of a moment in time after the moment illustrated in FIG. 8. For example, the panel $\mathbf{108}_2$ may have entered the horizontal door guide 106. The panel $\mathbf{108}_1$ may continue to move vertically (e.g., via an adjacent panel 108 below or the cable connected to the rotating mechanism 150). As the panel $\mathbf{108}_1$ continues to move vertically upward, the guide wheel 138 may contact a front surface 902 of the panel $\mathbf{108}_2$. The guide wheel 138 may provide additional support to prevent the panel $\mathbf{108}_2$ from moving or being angled back against the panel $\mathbf{108}_1$. Thus, the guide wheel 138 may help keep the panel $\mathbf{108}_2$ parallel to the other panels 108 in the horizontal door guide 106 in vertical position.

After the last panel $\mathbf{108}_1$ is moved into the horizontal door guide 106, the door 102 may be opened. The panels 108 may be vertically stacked in the horizontal door guide 106, as illustrated in FIGS. 1-3.

To close the door 102, the process may be repeated in reverse. For example, the panel $\mathbf{108}_1$ may be moved downward via the rotating mechanism 150. As the panel $\mathbf{108}_1$ moves towards and down the vertical door guide 104, the adjacent panel $\mathbf{108}_2$ may follow, and so forth. The alignment members 602 and 604 on adjacent end caps $\mathbf{120}_1$ and $\mathbf{120}_2$ may ensure that adjacent panels 108 are aligned as the door 102 is closed.

Figure 10:
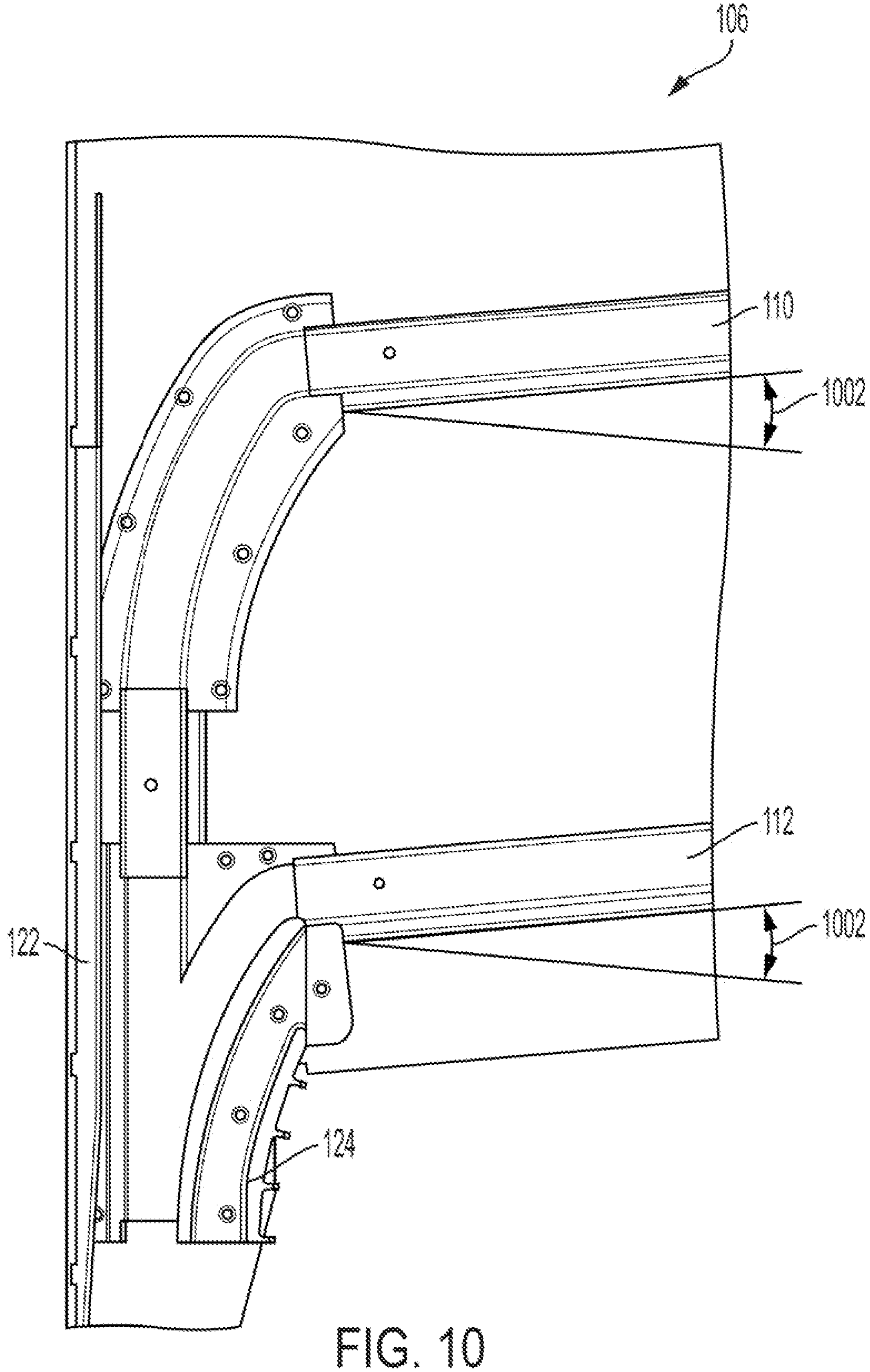
FIG. 10 is side view of the horizontal door guide with tracks and track coupling of the present disclosure.

In one embodiment, the first track 110 and the second track 112 may be angled. FIG. 10 illustrates an example of the first track 110 and the second track 112 coupled to the track coupling 124 in the horizontal door guide 106. In one embodiment, the first track 110 and the second track 112 may be installed in parallel, but at an angle 1002 relative to a horizontal. The angle 1002 may allow the door 102 be closed using a gravity assist. Thus, when the rotating mechanism 150 releases the up tension on the cable or is rotated in a closing direction, the angle 1002 may allow each panel 108 to slowly fall towards the vertical door guide 104. In other words, the horizontal door guide 106 may allow gravity to assist the movement of the panels 108 towards the vertical door guide 104 when the door 102 is closing.

Thus, the present disclosure provides a vertically stacking panel door that includes end caps with cam levers. The vertical door guide and horizontal door guide may be designed to cause the cam lever to rotate. The rotation of the cam lever may lift and separate adjacent panels of the door. The design of the end caps and the track coupling may allow the panel to easily move vertically and horizontally into the horizontal door guide, as described above.

In addition, the end caps may be retrofitted to existing doors. The design of the end caps may also be fabricated to fit on different sized panels. Thus, a door may be customized with different sized panels and still be able to operate in the vertically stacking door system of the present disclosure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A cam lever coupled to a top end of a body portion of an end cap for a first panel of a vertically stacking door, comprising:

a cam body portion comprising a first side and a second side, wherein the first side is opposite the second side, wherein a center of the cam body portion is pivotally mounted on an inner side of one of a right side and a left side of the end cap such that a portion of the cam body portion is positioned inside of the end cap between the right side and the left side of the end cap;

a first cam wheel coupled to the first side of the cam body portion on a first end of the cam body portion, wherein the first cam wheel extends beyond a back side of the end cap; and a second cam wheel coupled to the second side of the cam body portion on a second end of the cam body portion, wherein the second cam wheel extends beyond an outer side of the one of the right side and the left side, where the outer side is opposite the inner side;

wherein the first cam wheel and the second cam wheel are arranged such that movement of the second cam wheel in a downward direction causes the first cam wheel to move in an upward direction with a lift force to separate a second panel of the vertically stacking door from the first panel that is adjacent to the second panel.

2. The cam lever of claim 1, wherein the center of the cam body portion is coupled to the end cap via a rotatable coupling.

3. The cam lever of claim 1, wherein the second cam wheel interacts with a ramp on a vertical door guide that guides movement of the vertically stacking door to cause the first cam wheel to interact with the second panel.

4. The cam lever of claim 3, wherein an interaction of the second cam wheel with the ramp causes the cam body portion to rotate and move the second cam wheel in the downward direction and move the first cam wheel in the upward direction.

5. The cam lever of claim 1, wherein the first cam wheel and the second cam wheel are fabricated from at least one of: a nylon or a plastic.

6. The cam lever of claim 1, wherein an amount the cam body portion can rotate relative to the end cap is limited by the end cap.

7. A cam lever coupled to a top end of a body portion of an end cap for a first panel of a vertically stacking door, comprising:

a cam body portion comprising a first side and a second side, wherein the first side is opposite the second side, wherein the cam body portion comprises an opening adjacent a center of the cam body portion which receives a rotatable mechanical coupling that rotatably mounts the cam body portion on an inner side of one of a right side and a left side of the end cap such that a portion of the cam body portion is positioned inside of the end cap between the right side and the left side of the end cap, the rotatable mechanical coupling configured to allow the cam body portion to rotate around an axis of the rotatable mechanical coupling;

a first cam wheel coupled to the first side of the cam body portion on a first end of the cam body portion, wherein the first cam wheel extends beyond a back side of the end cap; and a second cam wheel coupled to the second side of the cam body portion on a second end of the cam body portion, wherein the second cam wheel extends beyond an outer side of the one of the right side and the left side, wherein the outer side is opposite the inner side, wherein the first cam wheel and the second cam wheel are arranged such that movement of the second cam wheel in a downward direction causes the first cam wheel to move in an upward direction with a lift force to separate a second panel of the vertically stacking door from the first panel that is adjacent to the second panel.

8. The cam lever of claim 7, wherein the second cam wheel interacts with a ramp on a vertical door guide that guides movement of the vertically stacking door to cause the first cam wheel to interact with the second panel.

9. The cam lever of claim 8, wherein an interaction of the second cam wheel with the ramp causes the cam body portion to rotate and move the second cam wheel in the downward direction and move the first cam wheel in the upward direction.

10. The cam lever of claim 7, wherein the first cam wheel and the second cam wheel are fabricated from at least one of: a nylon or a plastic.

11. The cam lever of claim 7, wherein an amount the cam body portion can rotate relative to the end cap is limited by the end cap.

* * * * *